(12) United States Patent
Bremner

(10) Patent No.: US 11,780,000 B2
(45) Date of Patent: Oct. 10, 2023

(54) METHOD OF FORMING PARALLEL SPIRAL CHANNELS IN HOUSING TO BE FORMED BY CASTING OR MOLDING PROCESS

(71) Applicant: DEERE & COMPANY, Moline, IL (US)

(72) Inventor: Ronald D. Bremner, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 85 days.

(21) Appl. No.: 16/861,957

(22) Filed: Apr. 29, 2020

(65) Prior Publication Data

US 2021/0339309 A1 Nov. 4, 2021

(51) Int. Cl.
| | | |
|---|---|---|
| B22C 9/10 | (2006.01) | |
| B22C 7/00 | (2006.01) | |
| H02K 5/06 | (2006.01) | |
| H02K 5/20 | (2006.01) | |

(52) U.S. Cl.
CPC .................. *B22C 9/10* (2013.01); *B22C 7/00* (2013.01); *H02K 5/06* (2013.01); *H02K 5/20* (2013.01)

(58) Field of Classification Search
CPC . B22C 9/10; B22D 25/02; H02K 5/06; H02K 5/20; H02K 5/203; H02K 9/19
See application file for complete search history.

(56) References Cited

U.S. PATENT DOCUMENTS

| | | |
|---|---|---|
| 3,009,072 A | 11/1961 | Mossay |
| 3,567,975 A | 3/1971 | Loomis |
| 5,443,413 A | 8/1995 | Pflager et al. |
| 5,523,640 A | 6/1996 | Sparer et al. |
| 5,856,716 A | 1/1999 | Coupart et al. |
| 6,909,210 B1 | 6/2005 | Bostwick |
| 7,009,317 B2 | 3/2006 | Cronin et al. |
| 7,322,103 B2 | 1/2008 | Burjes et al. |

(Continued)

FOREIGN PATENT DOCUMENTS

| | | | | |
|---|---|---|---|---|
| CN | 104218724 A | | 12/2014 | |
| CN | 108306444 A | * | 7/2018 | ............... H02K 5/20 |

(Continued)

OTHER PUBLICATIONS

German Search Report issued in application No. DE102021202754.7, dated Jan. 10, 2022, 12 pages.

*Primary Examiner* — Kevin E Yoon
*Assistant Examiner* — Jacky Yuen
(74) *Attorney, Agent, or Firm* — Taft Stettinius & Hollister LLP; Stephen F. Rost

(57) ABSTRACT

A method of producing a parallel spiral core for casting a housing includes designing a half cylinder body in a model based on a desired shape of the housing, adding parallel spiral features to the body in the model, and producing data of the model based on the desired shape of the housing with the parallel spiral features. The data is then loaded into a machining tool, which then machines a pattern of the parallel spiral core out of material. The method also includes casting the parallel spiral core from the pattern such that the parallel spiral core comprises a core body and a parallel spiral formed on the core body, the parallel spiral winding circumferentially about the core body from a first end to a second end of the core body.

17 Claims, 12 Drawing Sheets

(56) References Cited

U.S. PATENT DOCUMENTS

| | | |
|---|---|---|
| 7,626,292 B2 | 12/2009 | Baumann et al. |
| 7,675,209 B2 | 3/2010 | Masoudipour et al. |
| 8,183,723 B2 | 5/2012 | Fee et al. |
| 2001/0024000 A1* | 9/2001 | Lee ................ B28B 7/0029 264/125 |
| 2005/0268464 A1* | 12/2005 | Burjes ................ H02K 5/203 29/890.035 |
| 2007/0013241 A1 | 1/2007 | Schiferl et al. |
| 2009/0079278 A1 | 3/2009 | Kramer et al. |
| 2019/0115804 A1 | 4/2019 | Yamada |
| 2021/0115925 A1* | 4/2021 | Iizuka ................ H02K 15/14 |

FOREIGN PATENT DOCUMENTS

| | | | |
|---|---|---|---|
| DE | 1613014 A1 | 9/1970 | |
| DE | 4411055 A1 | 8/1995 | |
| EP | 0631365 A2 | 2/1998 | |
| EP | 0859447 A1 | 8/1998 | |
| EP | 1045505 A2 | 10/2000 | |
| EP | 3112061 A1 | 1/2017 | |
| JP | 3657312 B2 | 6/2005 | |
| JP | 2006197785 A | 7/2006 | |
| JP | 2011010525 A * | 1/2011 | |
| JP | 2011015578 A | 1/2011 | |
| WO | 2005099070 A1 | 10/2005 | |
| WO | 2008034682 A1 | 3/2008 | |
| WO | WO-2012079752 A2 * | 6/2012 | ............ F28F 21/084 |
| WO | 2019091351 A1 | 5/2019 | |
| WO | WO-2020003661 A1 * | 1/2020 | ............... H02K 7/14 |

\* cited by examiner

METHOD OF FORMING PARALLEL SPIRAL CHANNELS IN HOUSING TO BE FORMED BY CASTING OR MOLDING PROCESS

FIELD OF THE DISCLOSURE

The present disclosure relates to a housing, and in particular, to a method of forming flow channels or heat sinks in a housing to be formed by a casting or molding process.

BACKGROUND

Cooling jackets are beneficial for cooling electric motors and generators, such as brushless permanent magnet motors operating at high speeds and driven by fuel-powered engines to generate electrical power. Electric motors and generators generate considerable heat and require an efficient cooling system. Motors and generators are often equipped with a device for cooling formed of a cooling jacket provided with grooves or passages built into the motor/generator housing. Circulating oil or water, or even air through the grooves or passages provides cooling to the motors and generators.

In conventional machining applications, spiral or helical grooves are machined into a metal part. While helical grooves machined into a housing can successfully remove heat from these components, the machined spiral grooves are expensive to cut in a production environment. Further, casting a continuous helical spiral groove is not simple to achieve nor desirable due to the negative relief caused by the pitch of the spiral, unless parted on several planes, which is undesirable. The several parted planes force the use of multiple parting lines which means more complicated casting procedures and much higher manufacturing costs.

Thus, there is a need for a method of casting a spiral feature into a cast housing which is easy to manufacture and can successfully accommodate a cooling fluid for removing heat.

SUMMARY

In one embodiment of the present disclosure, a method of producing a parallel spiral core for casting a housing includes designing a half cylinder body in a model based on a desired shape of the housing; adding parallel spiral features to the body in the model; producing data of the model based on the desired shape of the housing with the parallel spiral features; loading the data into a machining tool; machining a pattern of the parallel spiral core out of material with the machining tool; and casting the parallel spiral core from the pattern such that the parallel spiral core comprises a core body and a parallel spiral formed on the core body, the parallel spiral winding circumferentially about the core body from a first end to a second end of the core body.

In a first example of this embodiment, the casting step comprises pouring a casting material into the pattern. In a second example, the casting step comprises forming the parallel spiral to include a wall that winds around the circumference of the core body between the first end and the second. In a third example, the method may include forming a top edge of the wall and a bottom edge of the wall to be substantially parallel to one another. In a fourth example, the wall is formed as a plurality of linear segments aligned parallel to one another between the first end and the second end.

In a fifth example, each of the plurality of linear segments is formed having a top edge and a bottom edge. In a sixth example, the top edge and bottom edge are formed substantially parallel to one another during the casting step. In a seventh example, the method may include determining a desired pitch of the parallel spiral features and adding the parallel spiral features to the body at the desired pitch. In a ninth example, the method may include adding draft to an outer diameter of the parallel spiral features in the model. In a further example, the machining step comprises machining the draft into the pattern.

In another embodiment of the present disclosure, a method of casting a motor housing assembly with parallel spiral cooling channels includes producing model data using a half cylinder body based on a shape of the motor housing and parallel spiral features based on a shape of the cooling channels; loading the model data into a machining tool; machining a pattern of a parallel spiral core out of material with the machining tool based on the model data; casting the parallel spiral core from the pattern such that the parallel spiral core comprises a core body and a parallel spiral formed on the core body, the parallel spiral winding circumferentially about the core body from a first end to a second end of the core body; positioning the parallel spiral core in a mold; pouring a cast material into the mold; and forming the motor housing assembly from the cast material and parallel spiral core.

In one example of this embodiment, the method may include pulling the parallel spiral core in a single direction to remove it from the mold. In a second example, the producing step comprises designing a half cylinder body in a model based on a desired shape of the housing; and adding parallel spiral features to the body in the model. In a third example, the method may include adding a draft angle to an outer diameter of the parallel spiral features in the model data; and machining the draft angle into the pattern.

In a fourth example, the casting step comprises pouring a casting material into the pattern. In a fifth example, the casting step comprises forming the parallel spiral to include a wall that winds around the circumference of the core body between the first end and the second. In a sixth example, the method may include forming a top edge of the wall and a bottom edge of the wall to be substantially parallel to one another. In a seventh example the casting step comprises casting the parallel spiral to include a plurality of substantially parallel linear segments from a first radial side to a second radial side, where the parallel spiral is free of any backdraft.

In a further embodiment of the present disclosure, a method of casting a motor housing assembly with parallel spiral cooling channels includes producing model data to form a parallel spiral core pattern by designing a half cylinder body based on a desired shape of the housing assembly, determining a pitch and draft angle, and adding parallel spiral features to the body in the model; loading the model data and material into a machining tool; machining the parallel spiral core pattern out of the material with the machining tool; casting the parallel spiral core from the parallel spiral core pattern such that the parallel spiral core comprises a core body and a parallel spiral formed on the core body, the parallel spiral winding circumferentially about the core body; positioning the parallel spiral core in a mold; pouring a cast material into the mold; and forming the motor housing assembly from the cast material and the parallel spiral core, where the motor housing assembly comprises an inner diameter with a cooling channel formed by a shape of the parallel spiral to include an inlet and walls that define a substantially uniform channel width.

In one example of this embodiment, the method may include pulling the parallel spiral core in a single direction to remove it from the mold.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

Figure 1:
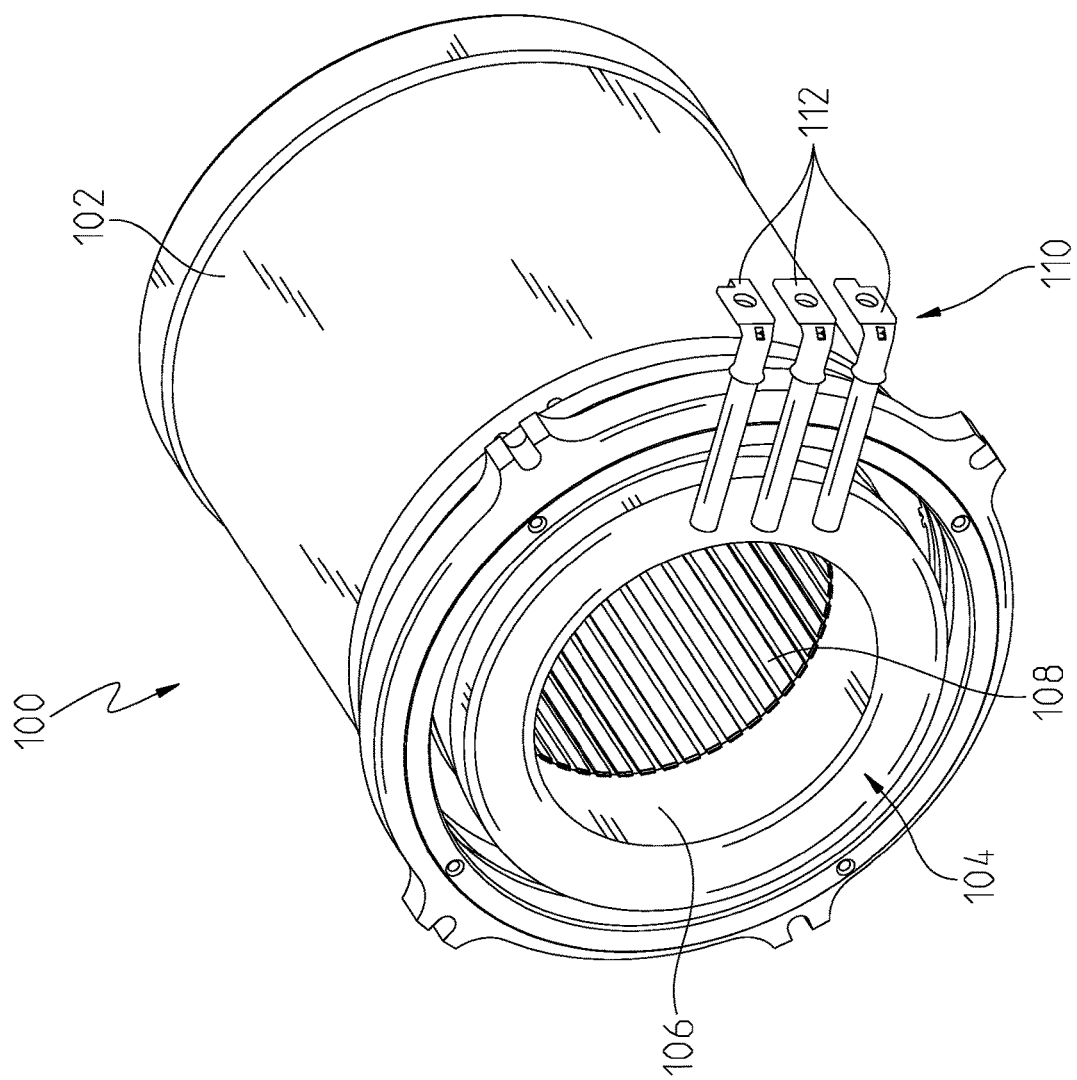
FIG. 1 is a perspective view of a motor housing assembly.

For the purposes of promoting an understanding of the principles of the present disclosure, reference will now be made to the embodiments described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

The present disclosure relates to one or more methods of manufacturing a core or mold for forming different cast parts. One example of a cast part that may be made as a benefit of the present disclosure is shown in FIG. 1. Here, a motor assembly 100 is shown including a motor housing 102 for enclosing or at least partially covering a motor for a machine or vehicle. In one example, the motor may operably drive one or more components of a machine in the agricultural, construction, forestry, industrial, or other known industries.

The motor assembly may include a stator assembly 104 as shown. The stator assembly is generally the stationary part of a rotary system found in electric motors, generators, and the like. The stator assembly 104 may provide a rotating magnetic field that drives a rotating armature. The stator assembly 104 in FIG. 1 may include a wire coil 106 and electrical sheets or laminations 108, as shown. A connector assembly 110 may include electrical leads 112 as also illustrated.

Figure 2:
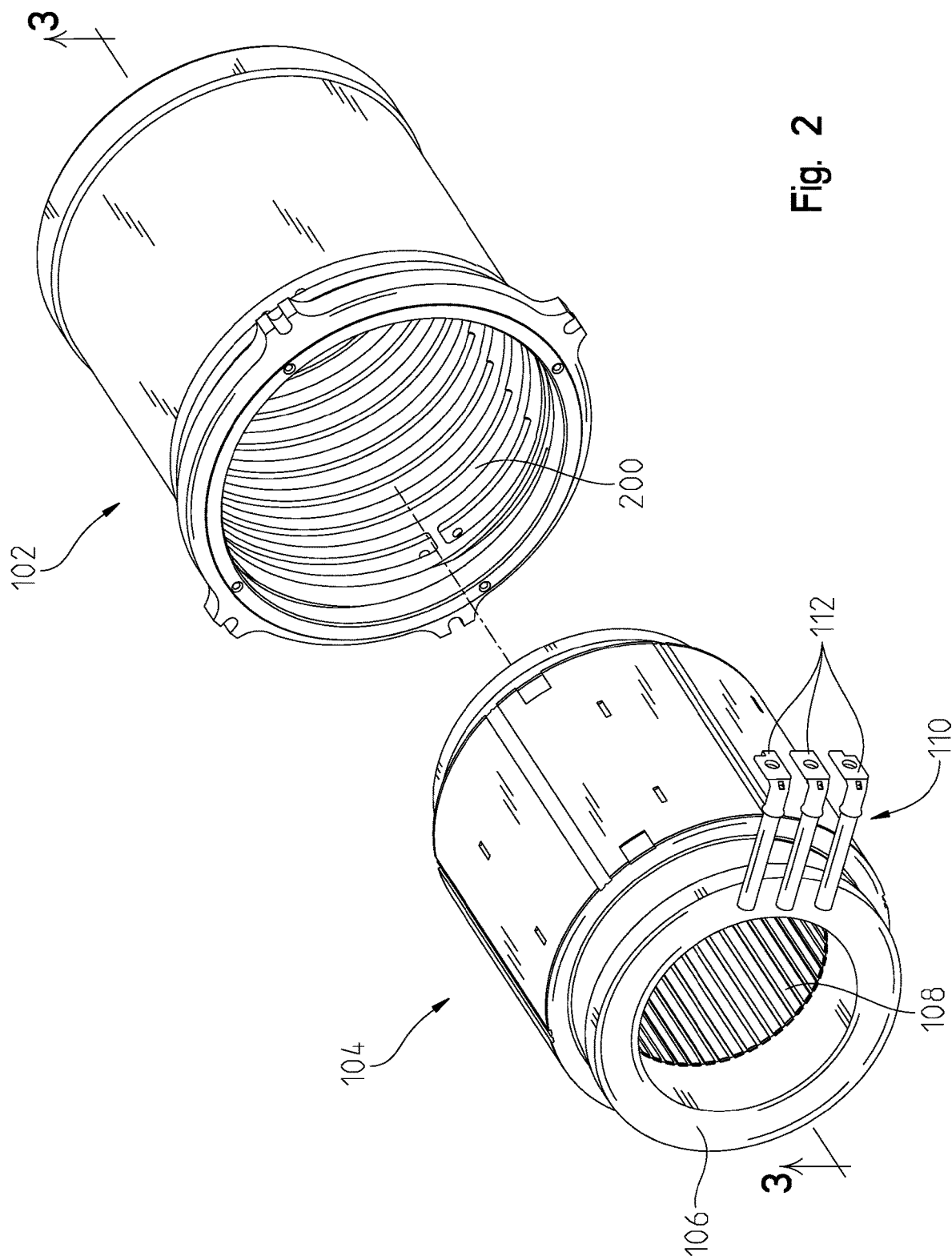
FIG. 2 is a partially exploded and perspective view of the assembly of FIG. 1.
Figure 3:
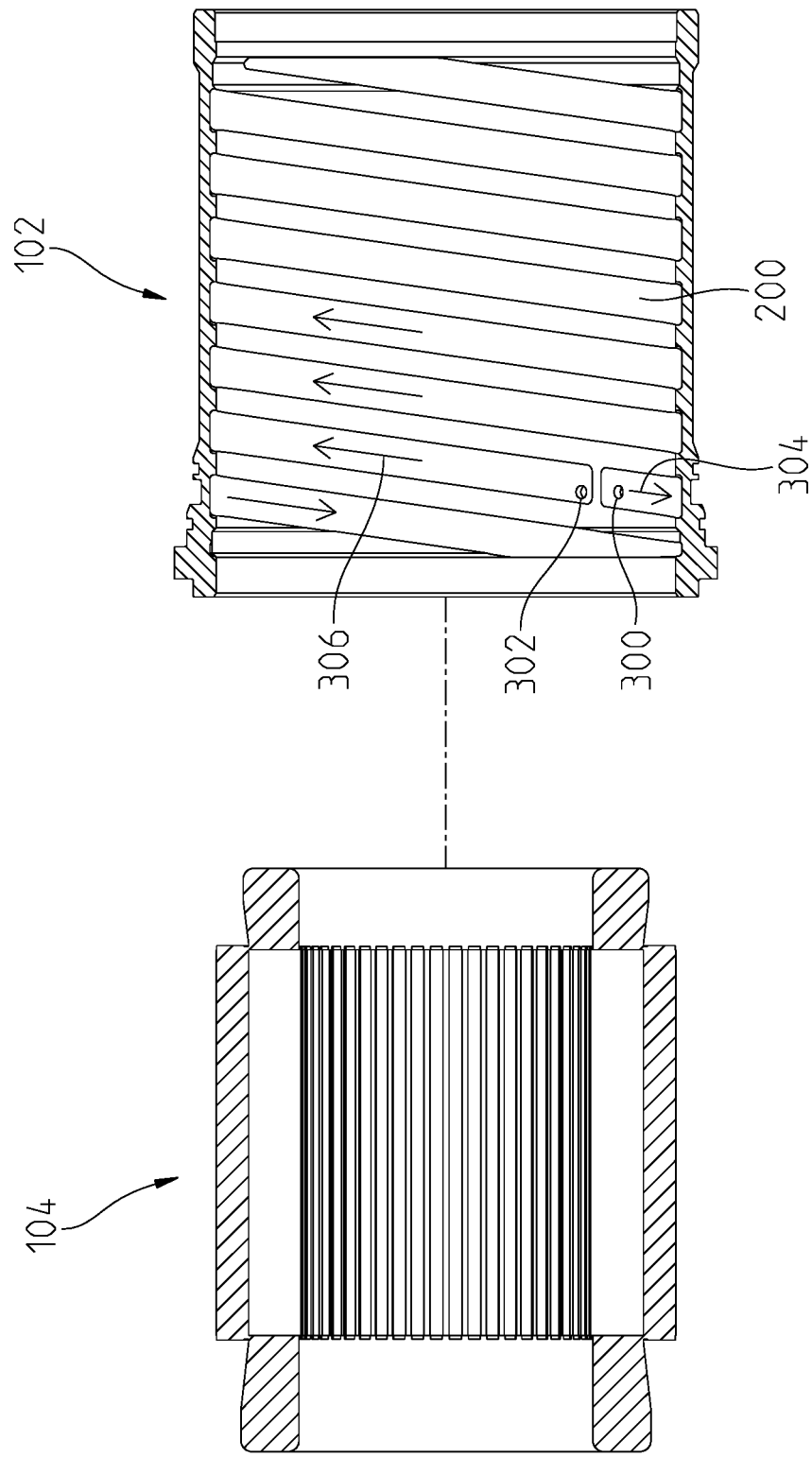
FIG. 3 is a cross-sectional view of the assembly of FIG. 2 taken along line 2-2.

The motor assembly of FIG. 1 is further illustrated in FIGS. 2 and 3 as well. Here, the stator assembly 104 is shown removed from the motor housing 102. The motor housing 102 may be cast to include one or more cooling channels or walls 200 defined therein. The cooling channel walls 200 may form a helical spiral in most conventional housings where a fluid or other coolant flows between the walls to cool the stator assembly 104. Referring specifically to FIG. 3, the cooling channel walls 200 define a first inlet 302 and a second inlet 300 where coolant may flow into the housing 102. As the coolant enters the housing 102, it may flow in a first spiral direction 304 or a second spiral direction 306 in which it flows along an interior of the housing 102 in a circumferential manner.

The cooling channels are important to the operation of the stator assembly 104. Specifically, the stator assembly 104 includes all of the windings and tends to get hot during operation. The cooling fluid or coolant is able to keep the stator assembly from overheating and functioning properly so long as it is in contact with the stator. It is not difficult to cast or otherwise form internal or external helical spiral shapes such as the cooling channels in the housing so long as a core or mold is available. The spiral forming mold or core, however, cannot be easily formed with a single pull direction unless additional material is added to the casting. To better understand the problems with conventional helical spiral shapes, it is noteworthy that a helical spiral generally has the shape of an open ended helical spring. A helix, when viewed from its side, has a sinusoidal shape. Helical spiral shapes are complex enough that it is difficult to add draft to them. If it is possible to add draft, portions of the cooling channel to be formed may be inconsistent. The channel may have narrow and wide portions, or 'lands' between the channels may be very narrow.

Again, it is possible to cast or mold parts that include helical spiral shapes, but these generally require two or more pull directions. A multi-pull cast or mold part can require a plurality of molds or dies which are pulled in several directions. This is less desirable because it is more complex and expensive than parts that require only a single direction pull. A part that can be made with a single pull direction may include draft on its inner or outer walls such that as the part cools it more easily is removable out of the mold (or the core can be removed more easily). If the part is sand cast, the core may include draft but can be made with a single parting line.

For parts that are not single pull direction cast parts, there may be undercut or backdraft due to any drafting added to the part. If the part is sand cast, material may break off (of the sand core) as the core is pulled from the core pattern. In this case, one or more additional cores may be required to form the part, which increases the complexity and expense of forming the part.

In the motor housing 102 of FIGS. 1-3, the casting process of the housing needs to be nearly perfectly cylindrical on the interior where the cooling channels are formed. In a conventional process, the helical spiral forming mold or core cannot be formed with a single pull direction without additional material being added. Moreover, the cross-section of the channel walls are not uniform unless more than one pull direction is utilized.

Referring to FIGS. 4-7, an example of a helical spiral core 400 is illustrated. This type of core is generally what is used to form the cooling channels in the motor housing 102 of FIG. 1. When a stator is installed in the motor housing, it is desirable for the stator not to rotate. This happens so long as the stator comes into contact with sufficient surface area with the cast housing.

Figure 4:
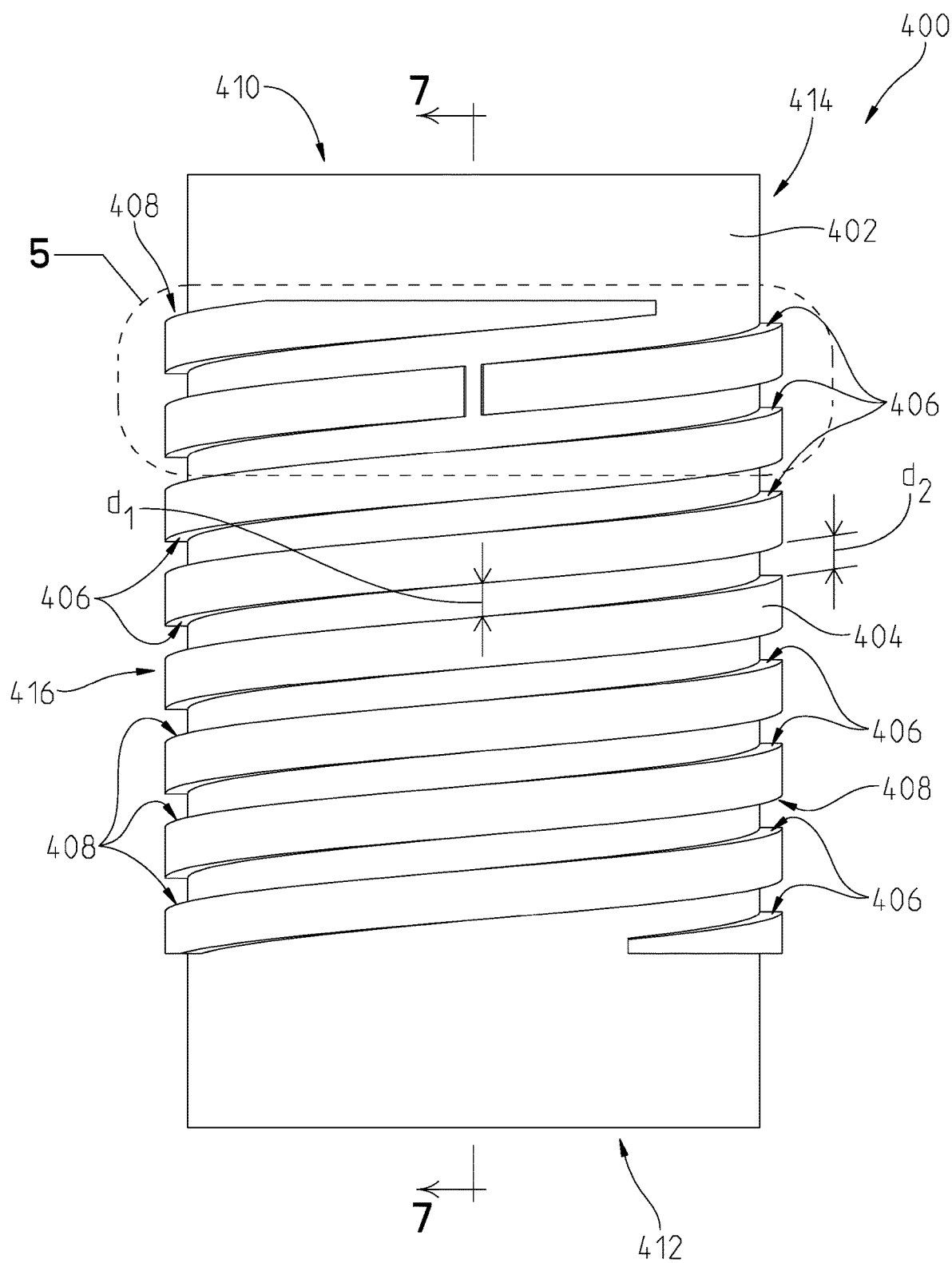
FIG. 4 is a front view of a core with helical spiral features.
Figure 5:
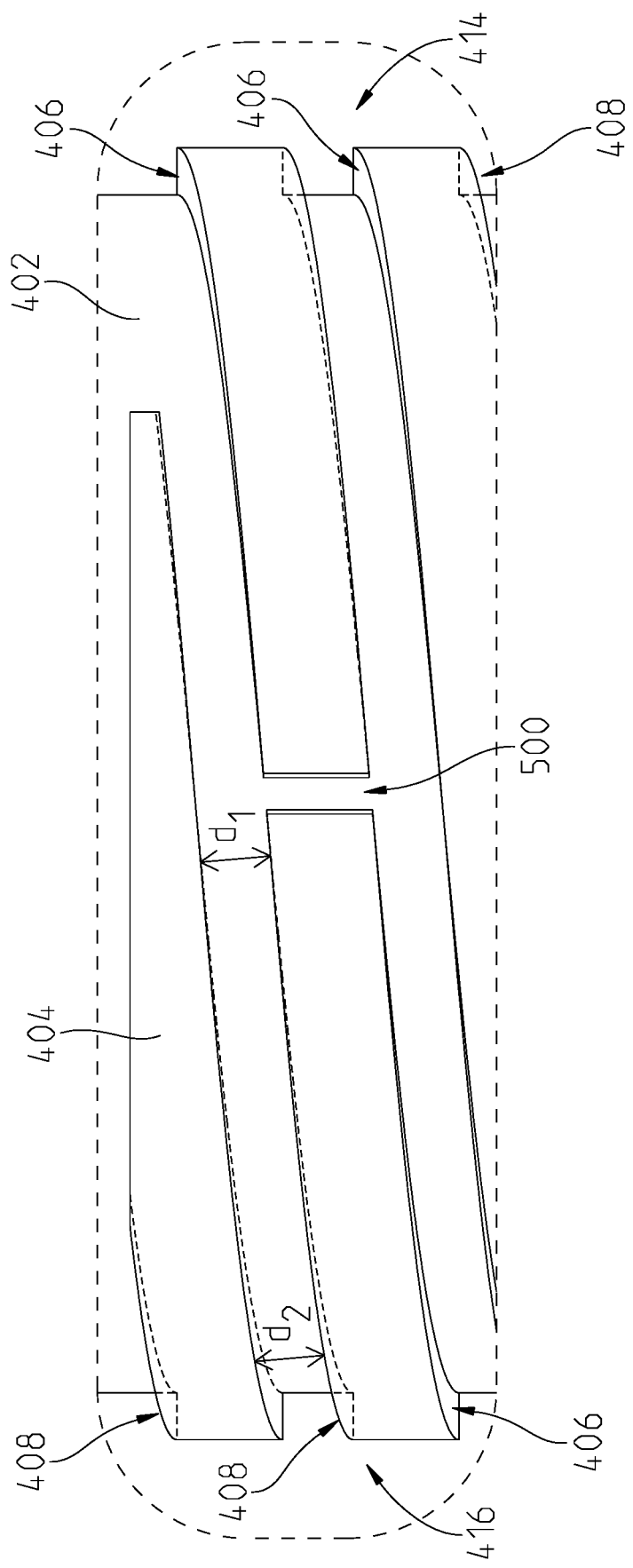
FIG. 5 is an enhanced front view of the core of FIG. 4 taken of section 5.

In the illustrated embodiment of FIG. 4, the helical spiral core 400 is shown without any draft. Here, the helical spiral core 400 includes a core body 402 with a helical spiral 404 formed on the core body 402. The helical spiral 404 takes the shape of a coil spring that winds around the circumference of the core body 402 from a first end 410 to a second end 412 as shown in FIG. 4. Moreover, the helical spiral 404 defines helical edges 406 and 408 without draft, and regions 408 having an undercut, which are best illustrated in FIG. 5. The core 400 has a first radial side 414 and a second radial side 416, where the first and second radial sides are offset by approximately 180° from one another. On the first radial side 414, the helical edges 406 are more clearly seen along the top surfaces of the helical spiral 404, whereas the undercut regions 408 are located along the bottom surfaces thereof.

In FIG. 5, a gap 500 is shown for the cooling channels. The gap 500 is a gap or space between the helical spiral 404. This gap in the core will form a wall in the casting. This will cause flow on each side of the gap 500 to flow to one end or the other. Referring to the second radial side 416, the helical edges 406 are located along the bottom surfaces of the helical spiral 404. The undercut regions 408 are located along the top surfaces of the helical spiral 404 on the second radial side 416.

When casting spiral features such as the cooling channels in the motor housing 102, when a mold or core is removed in a single pull direction the result is often backdraft. Backdraft, or negative draft, can induce material to be torn out when the mold, for example, is removed. If the pattern is formed from sand, for instance, the sand may tear out in regions of backdraft. If the aforementioned cooling channels are being formed and sand or other material tears out when the core or mold is removed, the resulting channel is often inconsistent in terms of its width. In other words, the channel may vary in width along its length when moving from the first radial side 414 to the second radial side 416. In FIG. 5, for example, the width at the second radial side 416 is shown as a second distance $d_2$, whereas the width between the two radial sides is shown as a first distance $d_1$. In this example, the first distance is narrower than the second distance due to the undercut regions 406.

Further, when casting a helical spiral pattern, it is often necessary to add draft at each radial side (i.e., 414, 416) in order to reduce or eliminate backdraft. In the areas of the undercut regions 408 or backdraft on the helical spiral 404, it is conventional to add material there to get draft and thus make it easier to remove a mold or core. This, however, also can reduce or make the width of the cooling channels uneven or inconsistent. In effect, this negatively reduces the cooling capability of the stator assembly 104 since less fluid or coolant is able to flow through the channel. In addition, laminations of the stator assembly 104 may not be fully supported on each side. This can result in the stator assembly failing. It has been found that uneven cooling channels can reduce the amount of cooling capability of the motor assembly 100.

Besides affecting the cooling capability, the surface area of the cooling channels is designed to have a width in which the stator assembly fits. With material being torn away or removed during the casting process, the channel widths vary which may allow the stator assembly to spin if no further action is taken. Thus, once the mold or core is removed, an additional machining step may be required to correct the width of the channels in the cast housing to prevent the stator assembly from spinning.

Figure 6:
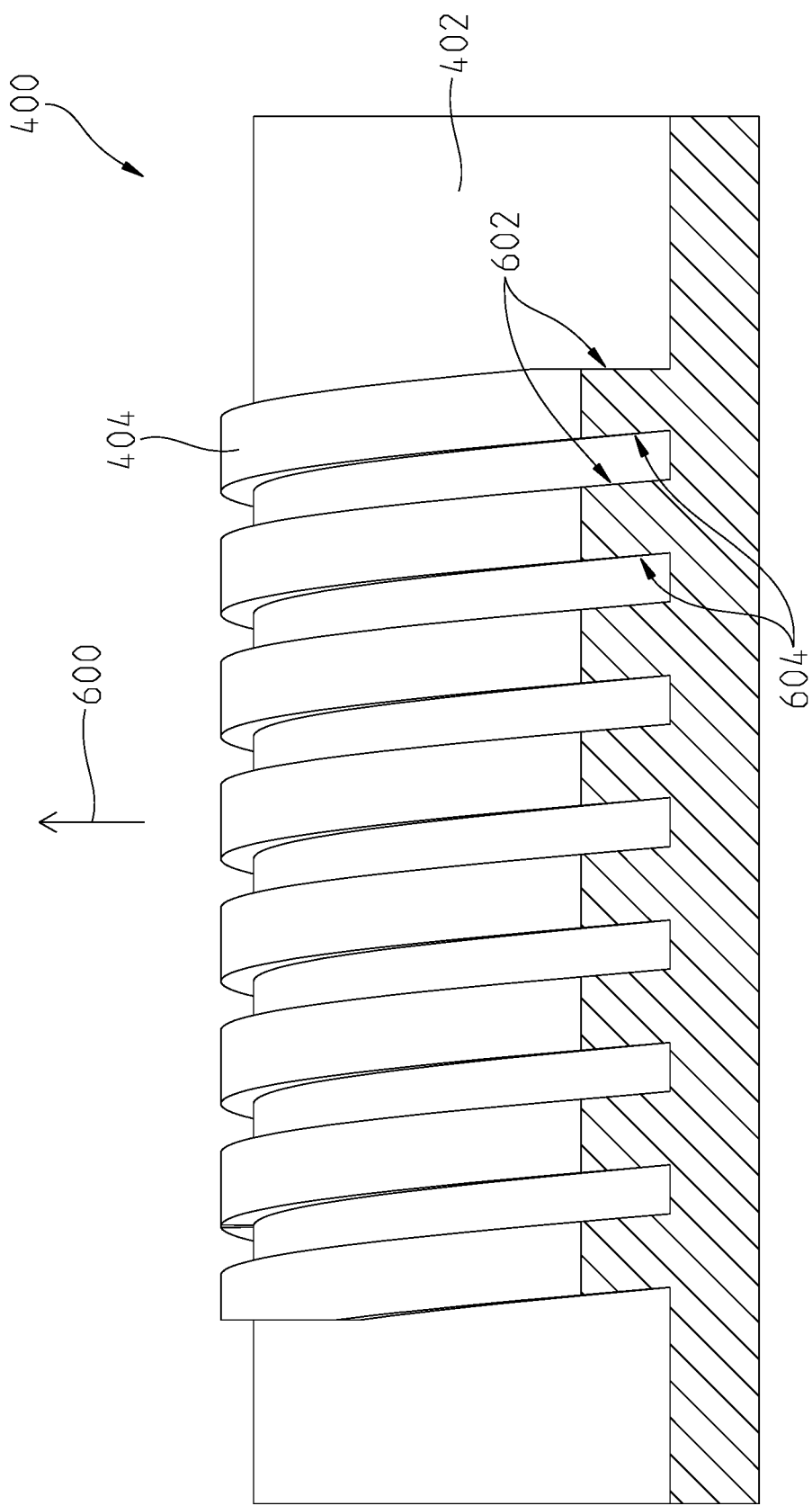
FIG. 6 is partial cross-sectional view of the core of FIG. 4.
Figure 7:
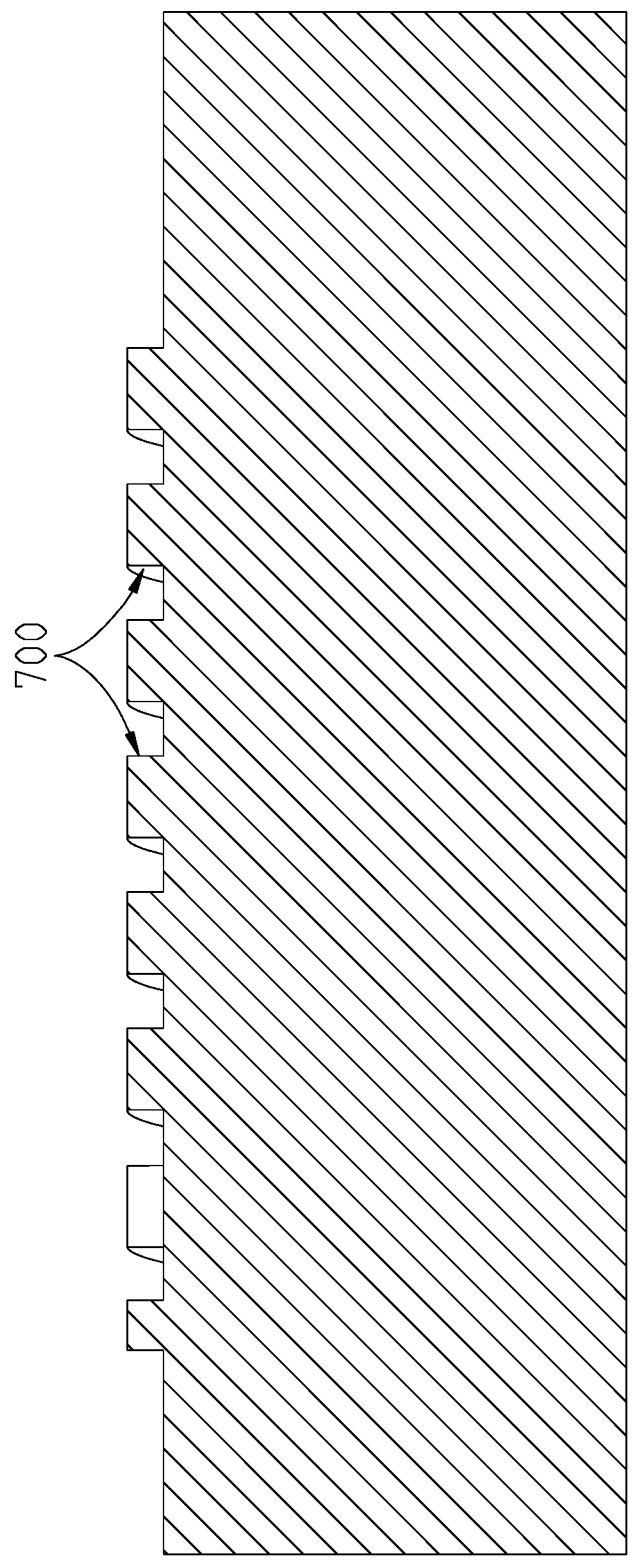
FIG. 7 is a cross-sectional view of the core of FIG. 4 taken along line 7-7.

To better illustrate this, cross-sectional portions of the helical spiral core 400 is shown in FIGS. 6 and 7. In the areas of the first distance d1, there is no draft 700 shown in FIG. 7. This corresponds to the midplane of the core 400. In FIG. 6, however, a direction of pull is shown as arrow 600. The helical spiral 404 is shown including on one side an area of positive draft 602 and on the opposite side thereof an area of undercut or negative draft 604. When the mold or core is removed by pulling in the direction indicated by arrow 600, portions of the resulting cooling channel may be removed in the area of undercut 604. This is undesirable in conventional helical spiral cores, but is generally unavailable without adding more pull directions and cores or molds.

Figure 8:
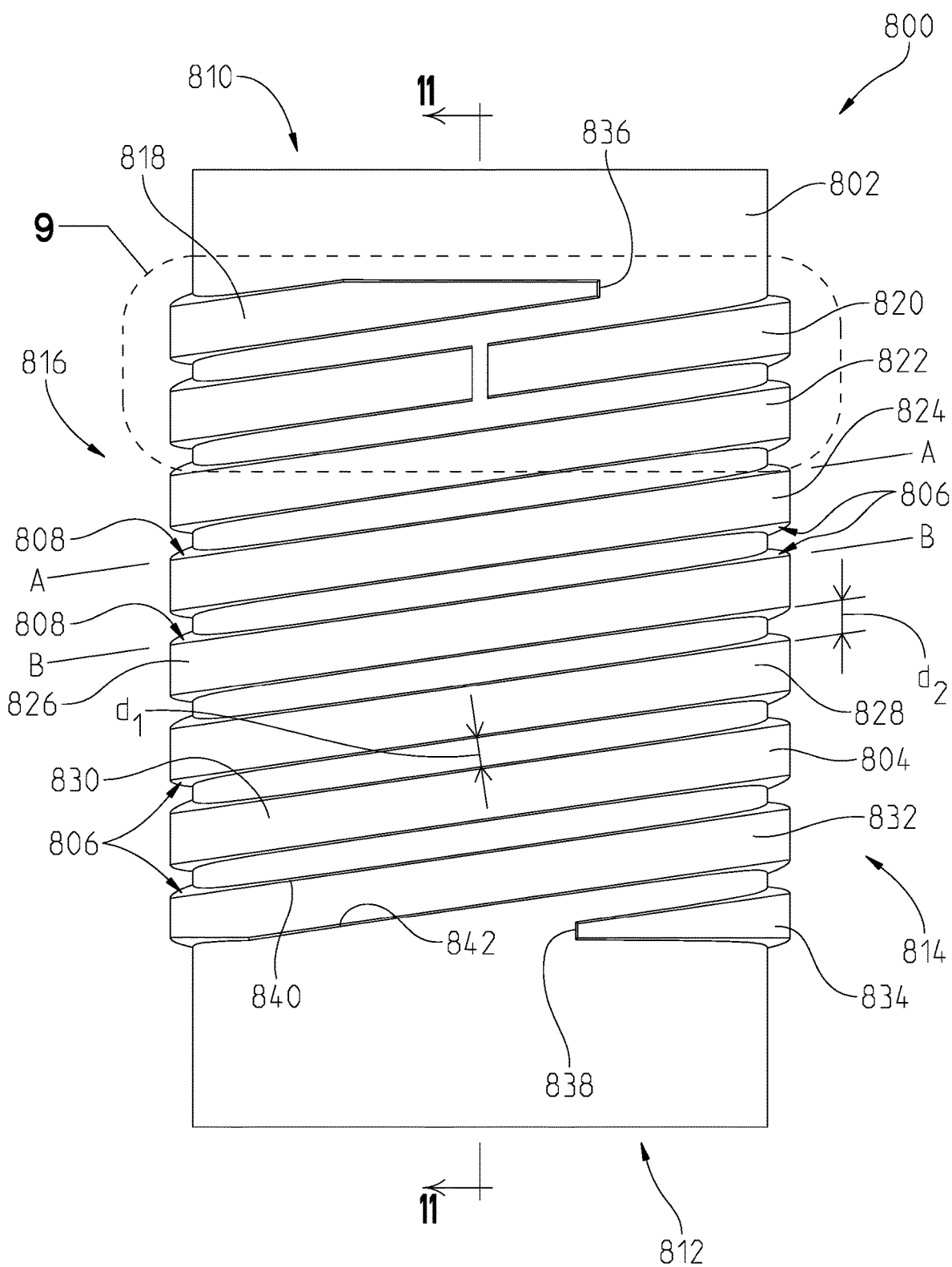
FIG. 8 is a front view of a core with parallel spiral features.
Figure 9:
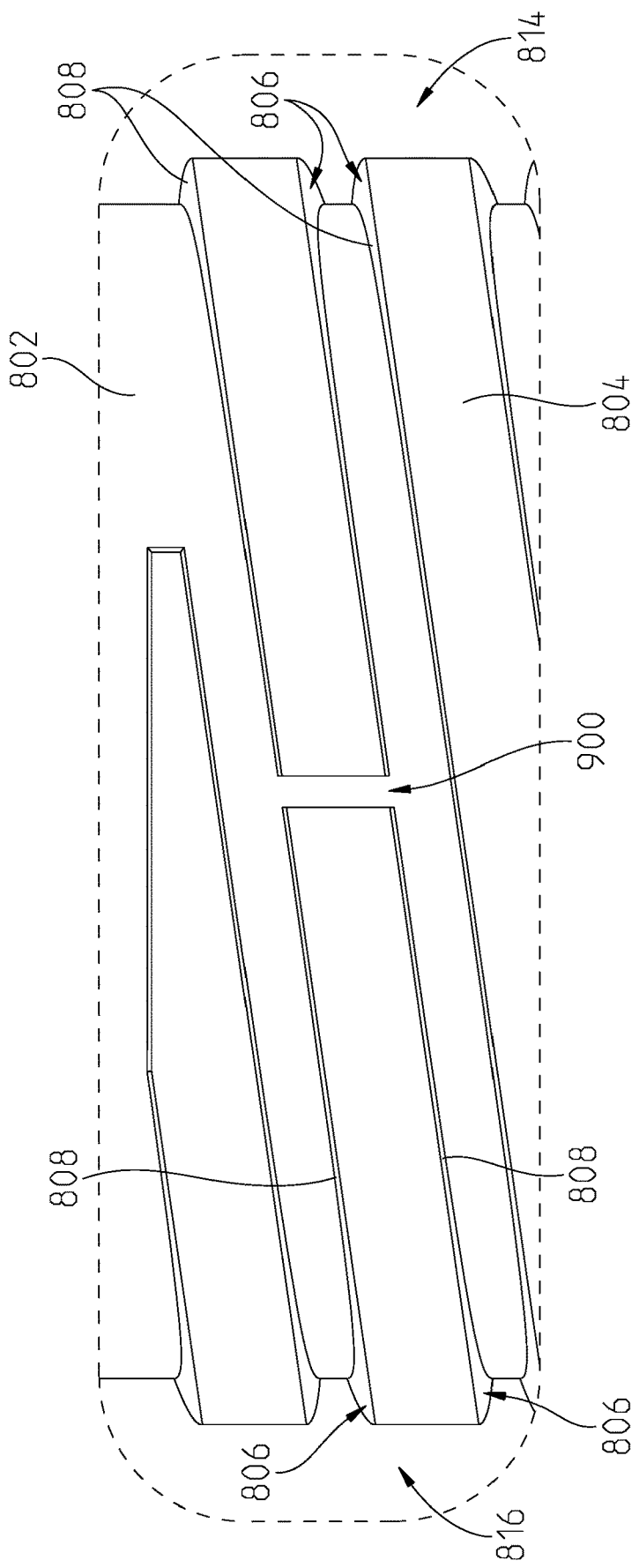
FIG. 9 is an enhanced front view of the core of FIG. 8 taken of section 9.

In order to overcome the issues with the conventional helical spiral core, a parallel spiral core is hereby disclosed. In FIGS. 8-11, a parallel spiral core 800 is illustrated. The parallel spiral core 800 may include a core body 802 with a parallel spiral 804 formed thereon. In this embodiment, the parallel spiral 804 may include draft 806 as shown in FIG. 8. A gap or space 900 may be formed in the parallel spiral 804, as shown in FIG. 9, so that an inlet for fluid or coolant may be provided.

The parallel spiral core 800 may include a first end 810 and a second end 812, where the second end 812 is opposite the first end 810. Moreover, the core 800 may include a first radial side 814 and a second radial side 816. The first and second radial sides may be offset by approximately 180° from one another.

The parallel spiral 804 is shown in its two-dimensional form in FIG. 8. However, it is understood that the parallel spiral 804 winds circumferentially between approximately the first end 810 and the second end 812 of the core body 802. The parallel spiral 804 may include a first end 836 and a second end 838. As shown in FIG. 9, the parallel spiral 804 may include the aforementioned gap or space 900 defined in its length at a location between the first end 836 and second end 838. The gap or space 900 in the core will form a wall in the cast housing, which divides flow in the cooling channel. One or more inlets may be machined as holes to either or both sides of the wall.

The parallel spiral 804 shown in FIG. 8 is shown as including a plurality of substantially linear segments between the first end 836 and second end 838. The plurality of substantially linear segments includes a first segment 818, a second segment 820, a third segment 822, a fourth segment 824, a fifth segment 826, a sixth segment 828, a seventh segment 830, an eighth segment 832, and a ninth segment 834. It is understood that this represents only a single embodiment, and the present disclosure is not intended to be limited to only this embodiment. Other embodiments may include additional or fewer segments.

One of the features of the parallel spiral core 800 is the parallel edges 808 formed by the parallel spiral 804. In FIG. 8, the parallel edge 808 of the fourth segment 824 of the parallel spiral 804 is located along a first plane, A-A. A second parallel edge 808 of the fifth segment 826 is located along a second plane, B-B. Planes A-A and B-B are substantially parallel to one another. Moreover, the parallel edges are substantially disposed along each plane from the first radial side 814 to the second radial side 816 and through the midplane. This is in contrast to the helical spiral core 400 where the edges of the helical spiral 404 are not parallel to one another. For this reason, the helical spiral core 400 cannot be pulled in a single direction without inducing the cooling channels to have varied widths.

In addition, each segment of the plurality of segments includes a top edge 840 and a bottom edge 842, as shown in FIG. 8. The top edge 840 may be substantially parallel to the bottom edge 842. The top edge 840 of each segment may be substantially parallel to the top edges of the other segments. Further, the bottom edge 842 of each segment may be substantially parallel to the bottom edges of the other segments. The only exception is at the first end 836 and second end 838 where the width of the first segment 818 and ninth segment 834 narrows.

The distance between parallel edges 808 is shown in FIG. 8 as a first distance $d_1$. With the top edges 840 and bottom edges 842 be approximately parallel to one another, the distance, $d_1$, is approximately the same from the first radial side 814 to the second radial side 816. As a result, the width of the cooling channel formed by the parallel spiral core 800 may be substantially even and consistent between both sides and thus around the circumference of the core body 802.

In FIG. 8, the outer edges of the parallel spiral 804 are parallel to one another and therefore of constant width. In effect, this may keep the deepest portion of each channel parallel as well, and not just at the outermost diameter of each parallel edge 808. In some cases, it may be desirable to either have the shallowest part of the channel (or edge) parallel, or a portion inbetween the shallowest and deepest part to be parallel. In one non-limiting example, a portion inbetween the two parts may be parallel. Further, suppose the portion of constant width is at the same depth as the housing is machined off After machining, there is a constant width at the inner surface. When the stator is later installed, all laminations may be advantageously supported the same.

Figure 10:
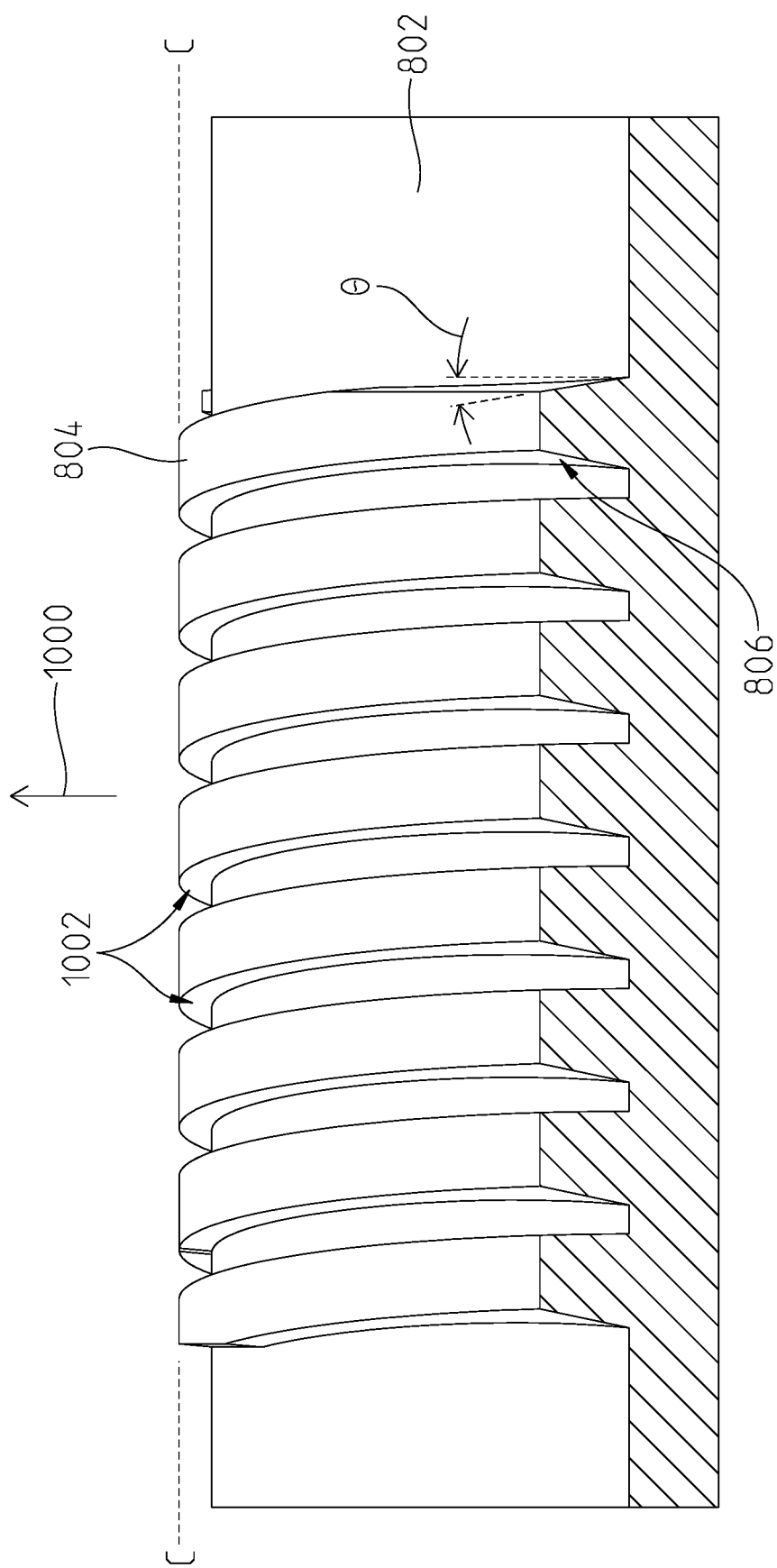
FIG. 10 is partial cross-sectional view of the core of FIG. 8.
Figure 11:
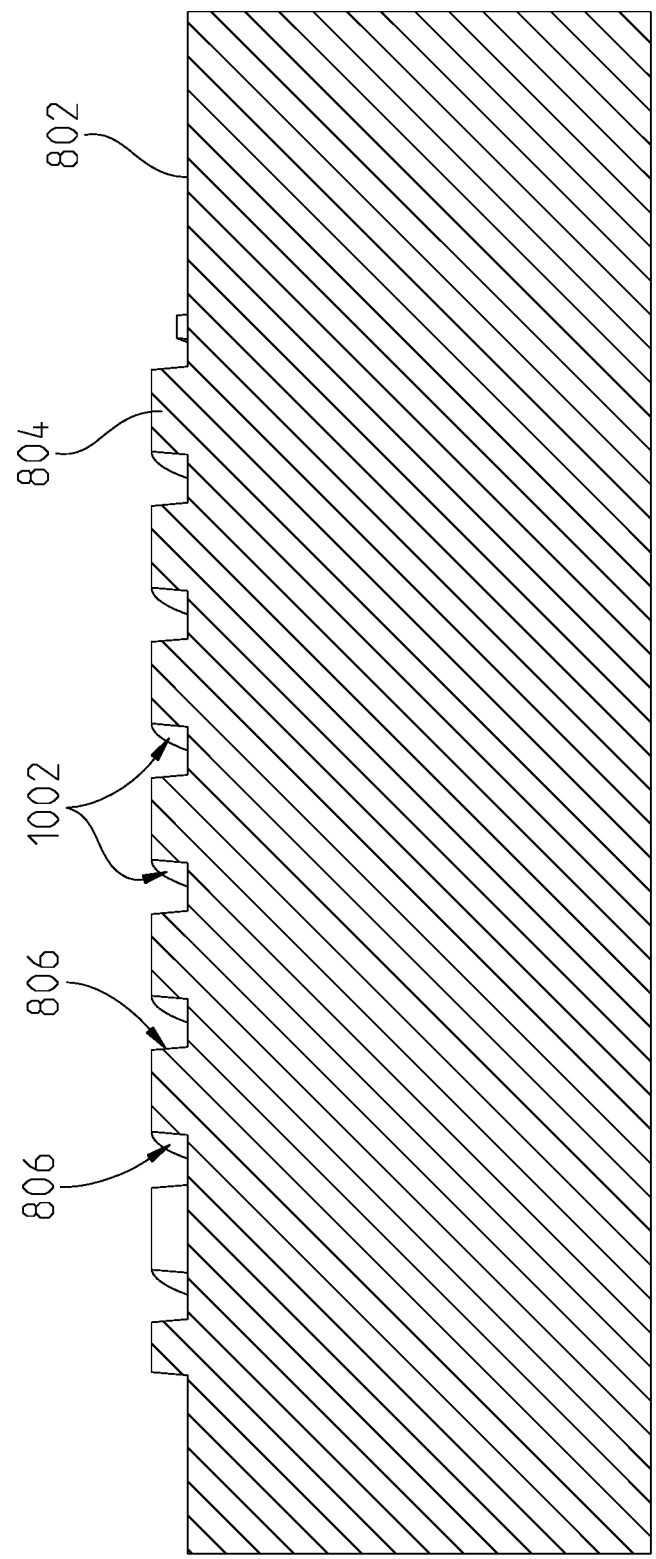
FIG. 11 is a cross-sectional view of the core of FIG. 8 taken along line 11-11.

The parallel spiral core 800 is further shown in FIGS. 10 and 11. Here, from a pull direction indicated by arrow 1000, walls 1002 formed by the parallel spiral 804 are substantially parallel and the angle is substantially constant when viewed in the pull direction 1000. The outer diameter surface of the parallel spiral 804 may be aligned along the same plane defined along axis C-C, as shown in FIG. 10.

A further advantage of the parallel spiral core 800 is that with the walls 1002 being substantially straight and parallel, less material needs to be added for draft. In FIG. 10, for example, the draft 806 added to the parallel spiral 804 is shown as angle θ. With draft, the core 800 may be pulled out or removed easily in the single pull direction 1000.

Further, the draft 806 in the walls 1002 at the first radial side 814 may be the same as the draft 806 added at the second radial side 816. This is in contrast to the helical spiral core 400 which often requires different drafts at different locations along the helical spiral 404. Moreover, the parallel spiral core 800 may have minimal draft added. In one non-limiting example, less than 5° of draft may be added. In a second non-limiting example, less than 3° of draft may be added. In a further non-limiting example, less than 2° of draft may be added. In yet another non-limiting example, approximately 2-3° of draft may be added to the parallel spiral 804. In yet a further non-limiting example, less than 1° of draft may be added. The amount of draft may be minimal and at least partly dependent upon the type of casting process being used. A sand casting process may utilize a slightly greater draft than a die-casting process, for example.

In order to form the cooling channels on the inner diameter of the motor housing 102 of FIG. 1, a core is first produced. If channels or fins were cast on the outer diameter of the housing, a mold may be used. In this case, the core may be used in a casting process to produce the housing. To produce the core, however, a model may first be prepared of the core. For an undrafted parallel spiral core, the surfaces of the parallel spiral may be modeled to be parallel to one another as described above. The model further prepares the walls 1002 of the parallel spiral 804 to be substantially aligned along the same axis, such as axis C-C.

In addition, the model may be produced such that a draft is added to the parallel spiral 804 to allow the core to be more easily removable from the cast housing. Draft 806 may be added on both sides of the walls 1002 to aid in removal in a single pull direction 1000.

Figure 12:
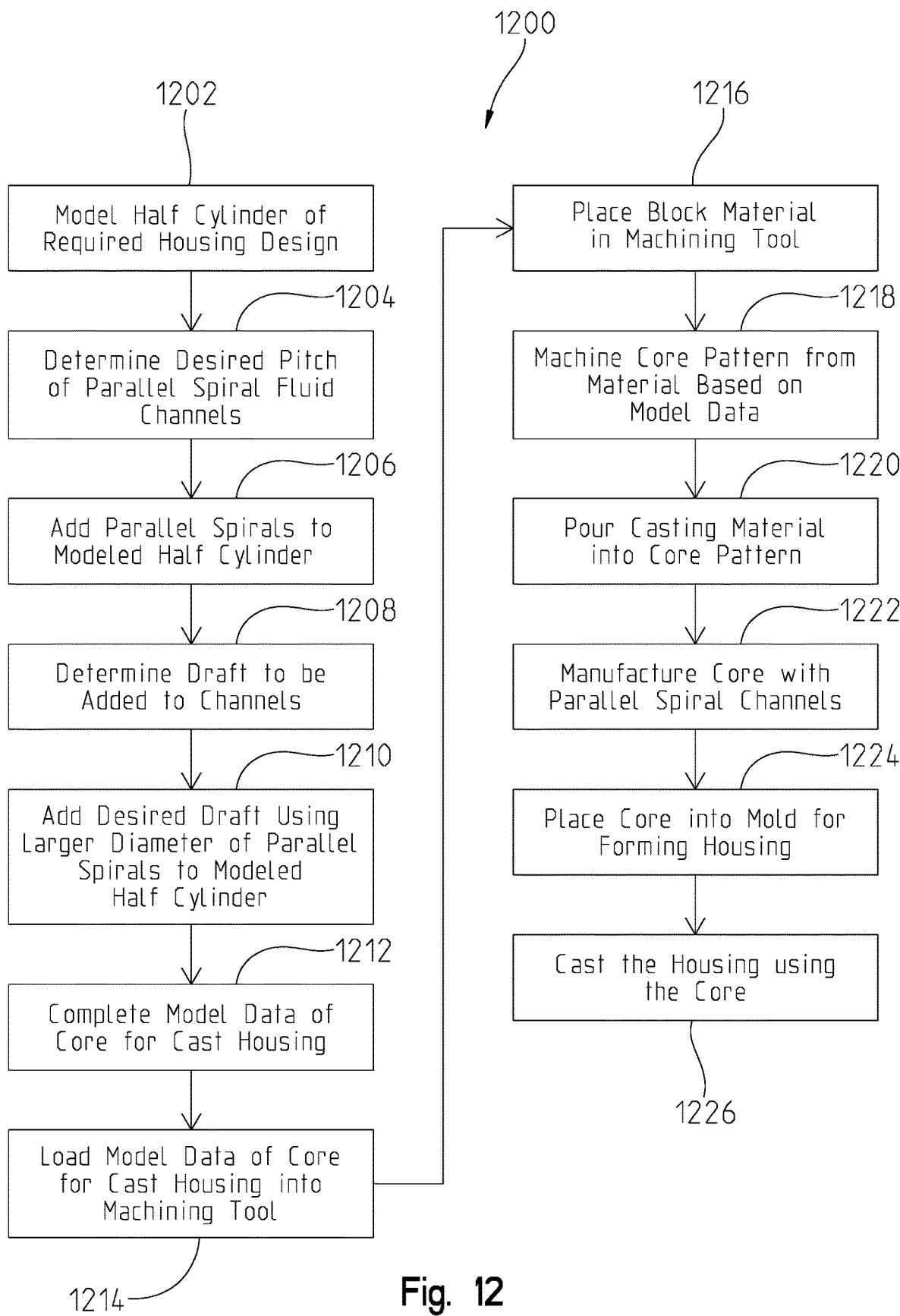
FIG. 12 is a method of forming a housing assembly with parallel spiral features.

Referring to FIG. 12, a method 1200 of forming a housing assembly with parallel spiral features is disclosed. Here, the method 1200 may include a plurality of blocks or steps which may be executed. In FIG. 12, the blocks or steps are depicted in a certain order. It is understood, however, that the blocks and steps in FIG. 12 may be executed in a different order. Moreover, not all of the block or steps shown in FIG. 12 may be executed in other embodiments. Further, there may be additional blocks or steps in different embodiments. Thus, the embodiment of FIG. 12 is only intended to illustrate one example of the method, but other embodiments are contemplated that fall within the scope of the principles and teachings of the present disclosure.

Turning now to FIG. 12, a first block 1202 in the method 1200 may include modelling a half cylinder based on the desired housing design. This first block 1202 is part of producing a core model which then may be used to produce the actual parallel spiral core. CREO or any other modelling program may be used. The model may be a set of instructions in the form of an algorithm, control logic, software, or the like which may be executable to produce the core. Thus, in this first block 1202, a set of instructions is prepared for modelling half of a cylinder based on the housing design. The cylinder being modelled will eventually form the core body of the parallel spiral core.

Once the half cylinder is modelled in block 1202, the method 1200 may advance to block 1204 where a desired pitch of the parallel spiral fluid channels is determined. In other words, the fluid channels will be angled at a desired pitch relative to an axis that passes through the center of the cylinder. In one non-limiting example, if the parallel spiral is approximately 30 mm, then the parallel lines will have an angle to them with a spacing of approximately 15 mm.

Once the desired pitch is determined in block 1204, parallel spirals are added using plates or boards to the model in block 1206 of the half cylinder which was previously modelled in block 1202. With the parallel spirals modelled, the method 1200 may advance to block 1208 where a desired draft to be added to the parallel spirals is determined. The desired draft may be in the form of an angle, for example, and it may be partly determined by the type of casting to be performed.

Once the desired draft is determined in block 1208, the method may advance to block 1210 where the desired draft is added to the model. Here, the outer diameter in the model is the outer wall of the parallel spiral. This outer diameter may be used as hinge edges, where the desired draft is added to the outer diameter. Once the draft is added to the model, the complete model data is complete in block 1212 for forming the parallel spiral core 800 of FIG. 8.

Following the execution of block 1212, the portion of the method 1200 for modelling the core is now complete. The method 1200 may next advance to the portion where the core pattern is fabricated. In block 1214, the CREO model data of block 1212 may be loaded into a machining tool such as a CNC. CNC data is commonly used by a CNC machine to form a desired core shape or pattern. In block 1216, material may be placed in the machining tool, and in block 1218 the core pattern may be machined out of the material using the model data.

Once the core pattern is machined in block 1218, the core may be manufactured. To do so, the method 1200 may advance to block 1220 where casting material may be poured into the core pattern. This may be sand or other material that is poured into the core pattern. If there are two halves, for example, then a complete spiral will exist on the core. If there is only one half to the pattern, however, then two core halves may be made. In this case, the two core halves may be added together to form a single parallel spiral core. In either case, the parallel spiral core is formed in block 1222 of the method 1200.

Once the parallel spiral core is formed in block 1222, the method 1200 may advance to block 1224 where the housing may be cast with the parallel spiral cooling channels. Here, the core may be placed into a mold for forming the outer housing. The housing may then be cast using the core in block 1226. The casting process may be sand casting, die-casting, or any other known type of casting process. The parallel spiral core may be pulled or removed from the mold along a single directional pull without tearing material from the cast housing. Moreover, the cooling channels formed in the inner diameter of the housing may be substantially uniform due to the parallel spiral core. If draft is added, the cooling channels may take the form with the draft angle. Without draft, the cooling channel walls may be substantially parallel to the direction of pull.

The aforementioned method 1200 may be performed for parallel spiral cores. It is very difficult, if not impossible, to perform method 1200 using helical spirals for the reasons described in this disclosure. Once the core model is preparing in block 1212, the parallel spiral core can be easily made from that generated data.

While exemplary embodiments incorporating the principles of the present disclosure have been described herein, the present disclosure is not limited to such embodiments. Instead, this application is intended to cover any variations, uses, or adaptations of the disclosure using its general principles. Further, this application is intended to cover such departures from the present disclosure as come within known or customary practice in the art to which this disclosure pertains.

The invention claimed is:

1. A method of casting a motor housing with parallel spiral cooling channels, comprising:
   producing model data using a half cylinder body based on a shape of the motor housing and parallel spiral features based on a shape of the cooling channels;
   adding a dividing wall in a selected spiral feature of the parallel spiral features;
   loading the model data into a machining tool;
   machining a pattern of a parallel spiral core out of material with the machining tool based on the model data;
   casting the parallel spiral core from the pattern such that the parallel spiral core comprises a core body and a parallel spiral formed on the core body, the parallel spiral winding circumferentially about the core body from a first end to a second end of the core body, and a gap in the parallel spiral formed on the core body between the first end and the second end of the core body, the gap being formed by the dividing wall in the selected spiral feature of the parallel spiral features of the model data;
   positioning the parallel spiral core in a mold;
   pouring a cast material into the mold;
   forming the motor housing from the cast material and the parallel spiral core such that the motor housing comprises the parallel spiral cooling channels formed by the parallel spiral of the core and a dividing wall formed by the gap in the parallel spiral on the core body, the parallel spiral cooling channels winding circumferentially about the motor housing from a first end to a second end of the motor housing, and the dividing wall dividing the parallel spiral cooling channels between the first end and the second end of the motor housing;
   machining a first inlet on a first side of the dividing wall to form a first cooling channel of the parallel spiral cooling channels that flows in a first spiral direction from the first inlet towards the first end of the motor housing; and
   machining a second inlet on a second side of the dividing wall to form a second cooling channel of the parallel spiral cooling channels that flows in a second spiral direction from the second inlet towards the second end of the motor housing; where the second side of the dividing wall is opposite the first side of the dividing wall, and the second spiral direction is opposite the first spiral direction.

2. The method of claim 1, further comprising pulling the parallel spiral core in a single direction to remove it from the mold.

3. The method of claim 1, wherein the producing step comprises:
   designing a half cylinder body in a model based on a desired shape of the housing; and
   adding parallel spiral features to the body in the model.

4. The method of claim 1, further comprising:
   adding a draft angle to an outer diameter of the parallel spiral features in the model data; and
   machining the draft angle into the pattern.

5. The method of claim 1, wherein the casting step comprises pouring a casting material into the pattern.

6. The method of claim 1, wherein the casting step comprises forming the parallel spiral to include a spiral wall that winds around the circumference of the core body between the first end of the core body and a first side of the gap and continues to wind around the circumference of the core body between an opposite side of the gap and the second end of the core body.

7. The method of claim 6, further comprising forming a top edge of the spiral wall and a bottom edge of the spiral wall to be substantially parallel to one another.

8. The method of claim 6, wherein the spiral wall is formed as a plurality of linear segments aligned parallel to one another between the first end and the second end of the core body.

9. The method of claim 1, wherein the casting step comprises casting the parallel spiral to include a plurality of substantially parallel linear segments from a first radial side to a second radial side, where the parallel spiral is free of any backdraft.

10. The method of claim 1, further comprising determining a desired pitch of the parallel spiral features and producing the parallel spiral features of the model data to have the desired pitch.

11. The method of claim 1, further comprising adding a draft angle to an outer diameter of the parallel spiral features in the model data.

12. The method of claim 1, further comprising machining a draft angle into the pattern of the parallel spiral core.

13. A method of casting a motor housing assembly with parallel spiral cooling channels, comprising:
producing model data to form a parallel spiral core pattern by:
designing a half cylinder body based on a desired shape of the housing assembly,
determining a pitch and draft angle,
adding parallel spiral features to the body in the model; and
adding a dividing wall in a selected spiral feature of the parallel spiral features;
loading the model data and material into a machining tool;
machining the parallel spiral core pattern out of the material with the machining tool;
casting the parallel spiral core from the parallel spiral core pattern such that the parallel spiral core comprises a core body and a parallel spiral formed on the core body, the parallel spiral winding circumferentially about the core body from a first end to a second end of the core body, and a gap in the parallel spiral formed on the core body between the first end and the second end of the core body, the gap being formed by the dividing wall in the selected spiral feature of the parallel spiral features of the model data;
positioning the parallel spiral core in a mold;
pouring a cast material into the mold; and
forming the motor housing assembly from the cast material and the parallel spiral core, where the motor housing assembly comprises an inner diameter with a first cooling channel formed by a shape of the parallel spiral on the core body between the first end of the core body and a first side of the gap, a second cooling channel formed by a shape of the parallel spiral on the core body between an opposite side of the gap and the second end of the core body, a dividing wall formed by the gap, and walls that define a substantially uniform channel width;
machining a first inlet on a first side of the dividing wall of the motor housing assembly for flow in a first spiral direction in the first cooling channel from the first inlet to a first end of the motor housing assembly formed by the first end of the core body; and
machining a second inlet on an opposite side of the dividing wall of the motor housing assembly for flow in a second spiral direction in the second cooling channel from the second inlet to a second end of the motor housing assembly formed by the second end of the core body, the second spiral direction being opposite to the first spiral direction.

14. The method of claim 13, further comprising pulling the parallel spiral core in a single direction to remove it from the mold.

15. The method of claim 13, wherein the casting step comprises forming the parallel spiral to include a spiral wall that winds around the circumference of the core body between the first end of the core body and a first side of the gap and continues to wind around the circumference of the core body between an opposite side of the gap and the second end of the core body.

16. The method of claim 15, further comprising forming a top edge of the spiral wall and a bottom edge of the spiral wall to be substantially parallel to one another.

17. The method of claim 15, wherein the spiral wall is formed as a plurality of linear segments aligned parallel to one another between the first end and the second end of the core body.

* * * * *